United States Patent [19]

Hexamer

[11] 4,238,002
[45] Dec. 9, 1980

[54] SUSPENSION DEVICE
[76] Inventor: Don L. Hexamer, 6142 Royalton, Dallas, Tex. 75230
[21] Appl. No.: 929,542
[22] Filed: Jul. 31, 1978
[51] Int. Cl.² .................... F03G 3/00; F16H 25/20
[52] U.S. Cl. .......................................... 185/27; 47/67; 47/39; 74/127
[58] Field of Search ....................... 185/27, 31, 32, 33; 248/324, 325, 327, 328, 317, 318, 330.1; 47/67; 40/473, 484, 493; 74/127

[56] References Cited
U.S. PATENT DOCUMENTS

| | | | |
|---|---|---|---|
| 471,886 | 3/1892 | Omer | 185/27 |
| 1,080,593 | 12/1913 | Schilling et al. | 185/27 |
| 2,251,364 | 8/1941 | McIlhon | 74/127 |
| 2,998,167 | 8/1961 | Boehm | 74/127 X |
| 3,471,148 | 10/1969 | Janiszewski et al. | 40/473 X |
| 4,117,630 | 10/1978 | Kalas | 47/67 |

Primary Examiner—Richard E. Moore
Attorney, Agent, or Firm—Hubbard, Thurman, Turner, Tucker & Glaser

[57] ABSTRACT

Apparatus for suspending a mass and using the weight of said mass to slowly rotate it. The apparatus includes a housing and a shaft within the housing coupled to said housing by means of a spiral cam so that longitudinal movement of the shaft causes the shaft to rotate. The shaft is also coupled to the housing by damping means which limits the rotational speed of the shaft to some preselected rate.

10 Claims, 3 Drawing Figures

SUSPENSION DEVICE

BACKGROUND OF THE INVENTION

This invention relates to apparatus for suspending an object and for providing slow rotation to the suspended object.

Prior art known to the applicant and believed to be relevant to the present invention includes U.S. Pat. No. 425,097 issued to Friess & Walzer on Apr. 8, 1890 and U.S. Pat. No. 758,527 issued to Graham on Apr. 26, 1904.

The Friess & Walzer patent teaches a clock motor in which the weight of a mass is converted to a rotational force by means of a spiral cam and gear arrangement. The Graham patent teaches a remote control train braking system in which a weight is released in response to a radio signal and falls at a rate controlled by a cushioning device.

It is common practice to hang decorative flowers or plants from the ceilings of residential or commercial buildings. Plants placed in such a position are typically exposed to sunlight during only a small portion of the day and only from one direction. It is well known that plants tend to grow towards the source of light and therefore nonuniform growth often results in such hanging baskets. The nonuniformity is often corrected by manually removing the hanging plant and rotating it on some regular basis such as monthly. It is apparent that a more uniform growth pattern would result from a continuous slow rotation of such plants.

SUMMARY OF THE INVENTION

Accordingly, an object of the present invention is to provide apparatus or suspending an object and simultaneously providing a slow continuous rotational motion to the object.

Another object of the present invention is to provide apparatus for suspending and rotating an object which uses the weight of the object to cause rotation so that no external power source is needed.

A suspension device according to the present invention includes a shaft positioned within a housing and extending from one end thereof and coupled to the housing by a spiral cam arrangement. The shaft is also coupled to the housing by damping means to limit the rotational speed of the shaft. The shaft includes means on one end for suspending a mass so that the weight of the mass provides an axial load on the shaft and the cam causes the shaft to rotate at a speed limited by the damping means.

BRIEF DESCRIPTION OF THE DRAWINGS

The present invention may be more fully understood by reading the following description of the preferred embodiments with reference to the accompanying drawings wherein.

DESCRIPTION OF THE PREFERRED EMBODIMENTS

Figure 1:
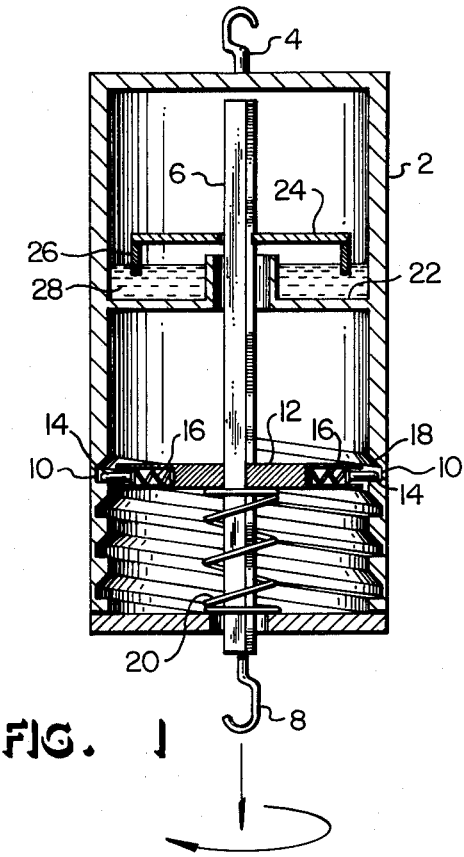
FIG. 1 is a partially cross-sectional view of a first embodiment of the present invention.

A first embodiment of the present invention is illustrated in FIG. 1. A generally cylindrical housing 2 includes a hook 4 on its upper end for connection to, for example, a typical ceiling hook. Within housing 2 is a shaft 6 having a rectangular cross-section. Attached to the lower end of shaft 6 is a second hook 8 from which may be suspended a mass such as a hanging basket containing a decorative plant. The inner surface of housing 2 has a spiral cam 10 in its lower portion. The cam 10 may either be machined into the inner surface of housing 2 or could be formed in a second element pressed within housing 2. An arm 12 is attached to shaft 6 at right angle and includes pins 14 for engaging the spiral cam 10. As illustrated, the spiral cam 10 has a very high pitch and is actually a double cam so that pins 14 engage the cam at the same level on opposite sides. Pins 14 fit within a recess in cross member 12 and are forced to engage cam 10 by springs 16. The upper edge 18 of cam 10 is beveled so that an upward force on shaft 6 and arm 12 forces the pins 14 back within the recesses in arm 12 and allows shaft 6 to move upward without rotation. A coil spring 20 around shaft 6 is provided to lift shaft 6 when the mass is removed from hook 8.

A damping means is also illustrated in FIG. 1. An annular trough 22 is provided on the inner surface of housing 2 and includes a clearance aperture in its center through which shaft 6 passes and in which it may rotate freely. A rotor 24 is also provided, having an aperture in its center of the same rectangular shape as the cross-section of shaft 6. The aperture in rotor 24 is sufficiently large so that it does not resist movement of shaft 6 along its axis. Rotor 24 includes at least one arm 26 extending down into trough 22. Preferrably a plurality of arms 26 will be affixed to rotor 24 to engage the damping means contained within trough 22.

Trough 22 is at least partially filled with a very viscous or semi-solid material which serves as the damping means to resistively limit the movement of arms 26 to a slow rate as such arms engage the damping means. A variety of materials may be used as the damping medium 28. Preferably the damping medium will be a very viscous liquid or a semi-solid or a solid having cold flow properties whereby arms 26 will move through the damping medium with a shearing type action and the medium will flow back together after the arms pass through such material. Examples of suitable damping material include heavy oils, tar-like materials, putty, modeling clay, and various polymeric materials which have cold flow properties. A preferred material is known by the chemical name cis-polybutadiene having cold flow properties. Such well known and available polymers known as "Silly Putty" are especially useful as damping mediums.

In operation the apparatus illustrated in FIG. 1 is connected by hook 4 to, for example, a ceiling hook. A hanging basket is then attached to hook 8. The weight of the hanging basket pulls downward on shaft 6 which is then resting on the cam 10. The cam causes the shaft to rotate as well as rotor 24, and the rotational speed is limited by the action of damping medium 28 on arms 26. The shaft 6 slowly rotates and moves downward under the influence of the mass hanging on hook 8. The rotational rate may be adjusted from the rate of several revolutions per day to one revolution in five to ten days by proper selection of damping medium 28, and the number of arms 26 attached to rotor 24. It is believed that for the purposes of maintaining plant symmetry a rotational speed of one revolution per week is appropriate. The rotational rate is also influenced by the pitch of spiral cam 10.

It can be seen that after a period of time, the shaft 6 will descend to the point that arm 12 reaches the bottom of cam 10 and at that point, motion will stop. As arm 12 descends within the lower portion of housing 2, spring 20 is compressed. As illustrated, the apparatus can be reset to the position shown in FIG. 1 by simply removing the suspended mass from hook 8 momentarily. Upon removal of the mass, the spring 20 forces the shaft 6 upward. The pins 14 are pressed back into shaft 12 under the force of spring 20 as they encounter the beveled portions 18 of cam 10. This ratchet type arrangement allows the shaft 6 to move upward without rotating.

Figure 2:
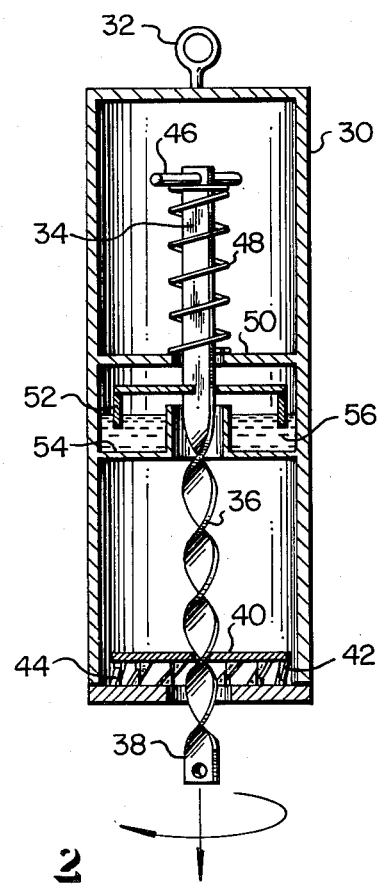
FIG. 2 is a partially cross-sectional view of a second embodiment of the present invention; and, FIG. 3 is a partially cross-sectional view of a third embodiment of the present invention.

FIG. 2 illustrates a second embodiment of the present invention which may cost less to produce and therefore be preferred over the FIG. 1 embodiment. The second embodiment also includes a housing 30 having a ring or hook 32 on its upper end for hanging from, for example, a ceiling hook. Within housing 30 is a shaft 34 having a rectangular cross-section. A lower portion 36 of shaft 34 has a spiral cam formed on its surface by simply twisting the shaft 34 into the form of a spiral. The lowest portion 38 of shaft 34 extends from the bottom of housing 30 and includes an aperture in which a hook may be placed to suspend a hanging basket or other object. The spiral portion 36 of shaft 34 passes through a ratchet wheel 40 having a rectangular slot in its center such that shaft 36 must rotate as it passes through the ratchet wheel 40. The ratchet wheel 40 has teeth 42 on its circumference which mate with teeth 44 on the lower end of housing 30 to prevent rotation of wheel 40 when the wheel is in its lowermost position. Ratchet wheel 40 is free to move upwards, when an upward force is applied, to disengage its teeth 42 from the teeth 44 on housing 30. A pin 46 passes through shaft 34 at its uppermost end. A spring 48 is positioned around the upper end of shaft 34 and contacts pin 46 at its upper end and an inner wall 50 of housing 30 at its lower end.

Damping means essentially identical to that shown in FIG. 1 are also provided in the FIG. 2 embodiment. This includes a rotor 52 constructed essentially identical to that shown in FIG. 1. A trough 54 contains a damping medium 56 as disclosed above.

The use of the FIG. 2 embodiment is identical to that of FIG. 1. The device is suspended by a hook or ring 32 from a ceiling hook and a mass such as a hanging basket is connected to the lower end 38 of shaft 34. In response to the downward force of the suspended mass, shaft 34 is pulled down and applies a downward force to ratchet wheel 40 which causes the teeth 42 to engage the teeth 44 on housing 30. With the teeth 42 and 44 thus engaged, the ratchet wheel 40 cannot rotate and the shaft 34 must rotate to pass through wheel 40. Rotation of shaft 34 is limited by the interaction of rotor 52 within the damping medium 56.

Again, it is apparent that after a period of time, shaft 34 will reach its lowermost limit and motion will stop. The downward movement of the shaft assembly will also cause spring 48 to be compressed. The device is reset to the position shown in FIG. 2, again by momentarily removing the weight from the lower end 38 of shaft 34. When the weight is removed, the spring 48 lifts the shaft 34 which in turn causes ratchet wheel 40 to move upward, disengaging the teeth 42 from the teeth 44 so that the ratchet wheel 40 is free to rotate as the shaft 34 moves upward without rotating.

Figure 3:
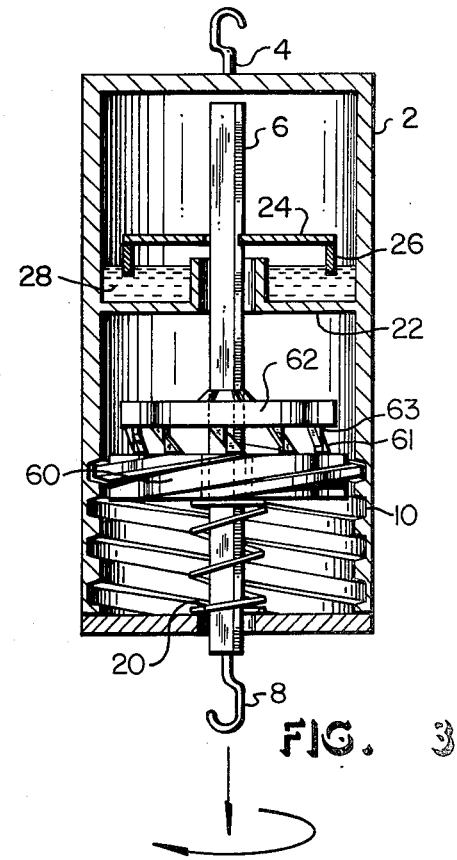

Another embodiment of the present invention is shown in FIG. 3. This embodiment is very similar to the FIG. 1 embodiment and the like designation numbers are used for like parts. This third embodiment includes an outer housing 2, upper hook 4, central shaft 6 and lower hook 8. The lower portion of housing 2 has a threaded screw sleeve 10 pressed into its inner surface which may be identical to the spiral cam of FIG. 1.

The primary difference between FIG. 3 and FIG. 1 is the means for coupling shaft 6 to the screw sleeve 10. In FIG. 3 a free rotating screw 60 is positioned within housing 2 to engage threads 10. This screw has an aperture in its center through which shaft 6 passes without any coupling. The means for coupling shaft 6 to screw 60 is a ratchet wheel 62 which is rigidly affixed to shaft 6. Screw 60 has teeth 61 on its upper surface and ratchet wheel 62 has mating teeth 63 on its lower surface. A coil spring 20 is positioned around shaft 6 between the bottom of housing 2 and screw 60.

The remaining elements of FIG. 3 are the annular trough 22, filled with a damping medium 28, and a rotor 24 having arms 26 for engaging the damping medium 28. These elements are essentially identical to like numbered elements in FIG. 1 and need no further description.

The FIG. 3 embodiment operates in essentially the same manner as the first two embodiments. The only difference is the manner in which the ratchet means functions to reset the apparatus to the position shown in FIG. 3. When the apparatus has been in use for a time so that shaft 6, screw 60 and ratchet wheel 62 have moved to their lowermost position and thereby compressed spring 20, resetting is accomplished by momentarily removing the mass from hook 8. Upon removal of the mass, spring 20 pushes screw 60 upwards and it in turn lifts ratchet wheel 62 and shaft 6. Screw 60 cannot move upwards without rotating. Ratchet teeth 61 and 63 are of sawtooth form so that the rotation of screw 60 in resetting lifts ratchet wheel 62 and thereby disengages the teeth 61 from teeth 63 so that wheel 62 and shaft 6 are lifted without rotation.

While the present invention has been shown and illustrated in terms of of specific apparatus, it is apparent that various modifications and changes can be made within the scope of the present invention as defined by the appended claims.

I claim:

1. Apparatus for suspending and rotating a body having mass comprising;
    (a) a housing,
    (b) a shaft within said housing and extending from one end thereof, said shaft coupled to said housing by spiral cam means for rotating said shaft in response to axial movement of said shaft,
    (c) means for supplying a load to said shaft to thereby cause said shaft to rotate by action of gravity on said load;
    (d) damping means contained within said housing; and
    (e) arm means operably connected to said shaft and extending into said damping means whereby rotation of said shaft causes movement of said arm means within said damping means to thereby control rotational speed of said shaft.

2. Apparatus for suspending a body having mass and rotating said body comprising:
    (a) a housing, having a spiral cam on at least a portion of its inner surface, (b) a shaft positioned within said housing and extending from one end thereof having a cam follower, said cam follower engaging said spiral cam so that movement of said shaft along its axis causes said shaft to rotate, (c) damping means contained within said housing, (d) arm means operably connected to said shaft and extending into said damping means whereby rotation of said shaft causes movement of said arm means within said damping means to thereby control rotational speed of said shaft, and (e) means for supplying a load to said shaft to thereby cause said shaft to rotate by action of gravity on said load.

3. Apparatus for suspending and rotating an object comprising:

(a) a housing, (b) a shaft positioned within said housing and extending from one end thereof, said shaft having a spiral surface along at least a portion of its length and said housing having means for engaging said spiral surface, whereby movement of said shaft along its axis causes said shaft to rotate, (c) damping means contained within said housing, (d) arm means operably connected to said shaft and extending into said damping means whereby rotation of said shaft causes movement of said arm means within said damping means to thereby control rotational speed of said shaft, and (e) means for supplying a load to said shaft to thereby cause said shaft to rotate by action of gravity on said load.

4. Apparatus according to claim 1 further including ratchet means for allowing said shaft to move axially into said housing without rotating.

5. The apparatus according to claim 1 wherein said damping means is selected from the group consisting of a viscous liquid, a semi-solid and a solid having cold flow properties.

6. The apparatus of claim 5 wherein said damping means is a polymer having cold flow properties.

7. The apparatus of claim 6 wherein said polymer is cis-polybutadiene.

8. Apparatus for suspending a body having mass and rotating said body comprising:

(a) a housing, having a spiral cam on at least a portion of its inner surface;

(b) a shaft positioned within said housing and extending from one end thereof having a cam follower, said cam follower engaging said spiral cam so that movement of said shaft along its axis causes said shaft to rotate;

(c) damping means coupled to said housing and to said shaft to limit the rotational speed of said shaft;

(d) ratchet means for allowing said shaft to move axially into said housing without rotating; and, (e) a spring coupled between said shaft and said housing for urging said shaft into said housing.

9. Apparatus for suspending and rotating an object comprising:

(a) a housing;

(b) a shaft positioned within said housing and extending from one end thereof, said shaft having a spiral surface along at least a portion of its length and said housing having means for engaging said spiral surface, whereby movement of said shaft along its axis causes said shaft to rotate;

(c) damping means coupled to said housing and said shaft to limit the rate of rotation of said shaft; and, (d) ratchet means for allowing said shaft to move axially into said housing without rotating.

10. Apparatus according to claim 9 further including a spring coupled between said shaft and said housing for urging said shaft into said housing.

* * * * *